United States Patent [19]

Kim et al.

[11] Patent Number: 5,758,542
[45] Date of Patent: Jun. 2, 1998

[54] SYSTEM FOR COUPLING WORM SPEED REDUCER TO MOTOR

[75] Inventors: Yojitsu Kim; Katsumi Fujimura; Yoshikazu Ueyama, all of Osaka-fu, Japan

[73] Assignee: Tsubakimoto Emerson Co., Osaka-fu, Japan

[21] Appl. No.: 725,772

[22] Filed: Oct. 4, 1996

[51] Int. Cl.⁶ .................. F16H 1/16; F16H 57/02
[52] U.S. Cl. ........................ 74/425; 74/606 R
[58] Field of Search .................. 74/89.14, 425, 74/606 R

[56] References Cited

U.S. PATENT DOCUMENTS

| | | | |
|---|---|---|---|
| 2,038,731 | 4/1936 | Gunderson | 74/425 |
| 2,052,674 | 9/1936 | Symonds | 74/425 |
| 2,734,393 | 2/1956 | Luenberger | 74/425 |
| 5,572,906 | 11/1996 | Jorg | 74/425 |

OTHER PUBLICATIONS

"Worm Speed Reducer", Slibaki Bulletin No. 89024, pub'd May 18, 1989, Tsubakimoto Emerson Co.

*Primary Examiner*—Allan D. Herrmann
*Attorney, Agent, or Firm*—Dann, Dorfman, Herrell and Skillman; Henry H. Skillman

[57] ABSTRACT

A system for coupling a motor with a worm speed reducer in which the work hours for assembling the worm speed reducer to the motor can be reduced, and the size and the weight of the reducer can also be minimized. A side of the worm speed reducer case 2 coupled to the motor case 1 is made to comprise an open face and through the open face, a worm gear G is installed inside the speed reducer case 2. A worm W is formed on the circumference of a projected free end of a motor spindle 7 and the bearings for the motor spindle 7 are mounted in a motor case flange 9. The open face of the speed reducer is covered with the flange 9 and the reducer case and the flange 9 are firmly clamped by bolts, thus releasably coupling the motor to the speed reducer.

7 Claims, 2 Drawing Sheets

SYSTEM FOR COUPLING WORM SPEED REDUCER TO MOTOR

FIELD OF THE INVENTION

The present invention relates to a motor having a worm speed reducer, more particularly to a system for coupling the motor with the speed reducer.

BACKGROUND OF THE INVENTION

In a conventional system for coupling a motor to a worm speed reducer, the coupling has been made such that a worm engaged with a worm gear is installed on a shaft mounted inside the speed reducer case. The spindle of the motor is coupled to the worm shaft of the reducer, and the reducer case is coupled to a flange on the motor case by bolts or the like.

An embodiment of a conventional system is shown in FIGS. 3 and 4. A worm W and a worm gear G are engaged with each other inside a speed reducer case H. Both ends of a worm gear shaft F are supported by bearings B1,B1 and both ends of a worm shaft S are also supported by bearings B2,B2. A projected free end of a motor spindle D is inserted into a fitting hole bored on one end of the worm shaft S and is held by a detent, whereby the motor spindle D is coupled to the worm shaft S so as to transmit the power thereto. A flange A attached to the speed reducer case H is firmly coupled to a motor case M by clamping members R such as bolts.

In the foregoing conventional coupling system, since the worm W and the worm gear G are engaged each other in advance and installed inside the speed reducer case, it is necessary that a worm gear installation opening larger than the diameter of the worm gear G is provided in the case H and the opening is covered with a cover C after installation, and that an opening for installing the worm W inside the case H is provided and the bearings B2,B2 are provided to support the both ends of the worm shaft S. Therefore, the conventional coupling system needs many parts in relation to the speed reducer case H, such as the cover C, fitting bolts for the cover C, and the bearings B1,B1 and B2,B2 for the worm gear shaft and the worm shaft. And, it also needs very many man-days in assembling a motor to the speed reducer.

SUMMARY OF THE INVENTION

In order to solve the problem described above, the present invention reduces the number of parts needed to assemble a speed reducer case by coupling a worm speed reducer to a motor such that a worm is directly formed on the circumference of a projected free end of a motor spindle supported by bearings embedded on a flange of a motor case. One end of the speed reducer case is coupled to the motor case and is formed to be an open face. The worm gear which is to be engaged with the worm inside the speed reducer case is installed through the open face, both ends of a worm gear shaft being supported by bearings embedded on the speed reducer case. The projected free end of the motor spindle extends into the speed reducer case through the open face so as to engage the worm formed on the circumference of its free end with the worm gear. The open face of the speed reducer case is closed by the motor case flange, which is detachably clamped onto the speed reducer case.

The present invention provides an improved method for coupling a speed reducer to a motor. The worm gear is installed inside the speed reducer case through the open face thereof. The worm gear shaft is inserted through holes formed through the case and bearings are pressed from outside the case over the worm gear shaft and are fitted in the bearing embedding holes to journal the gear shaft for rotation in the case. Next, the projected free end of the motor spindle is inserted into the speed reducer case through the open face thereof, and the worm formed on the circumference of the projected free end of the motor spindle is engaged with the worm gear. When assembled, the open face of the speed reducer case engages against the outwardly-directed surface of the motor case flange which surrounds the motor spindle and mounts bearings for the projected motor spindle. The motor case flange and the speed reducer case are clamped together by bolts or the like, thus coupling the speed reducer case to the motor case.

BRIEF DESCRIPTION OF THE DRAWINGS

All of the objects of the present invention are more fully set forth hereinafter with reference to the accompanying drawings, wherein.

DESCRIPTION OF THE PREFERRED EMBODIMENT

Figure 1:
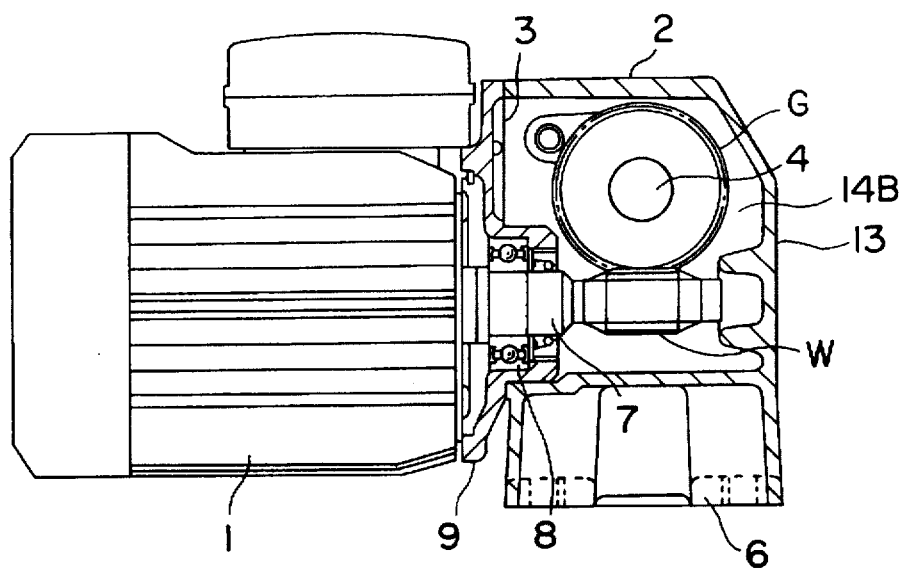
FIG. 1 is a side elevational view illustrating a motor with a worm speed reducer partially in longitudinal section according to the present invention.
Figure 2:
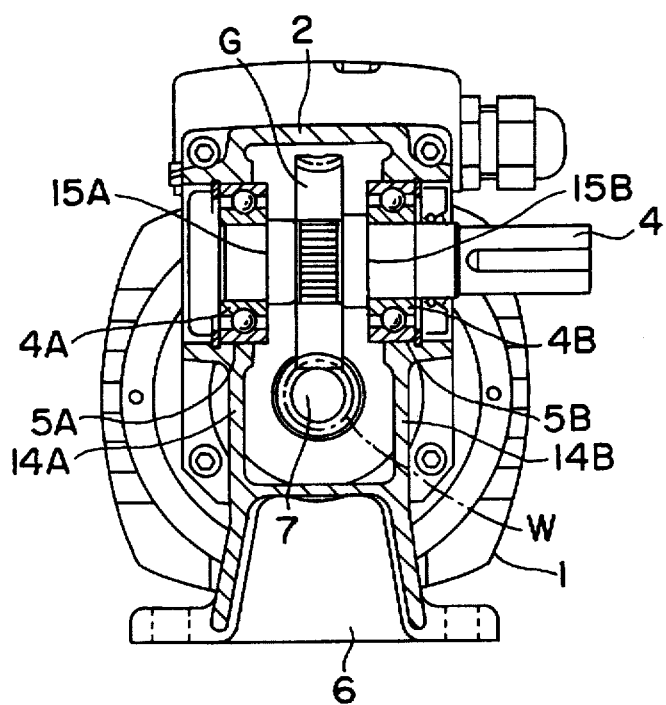
FIG. 2 is an end elevational view of the embodiment of the invention shown in FIG. 1, with the speed reducer partially in transverse section according to the present invention.
Figure 3:
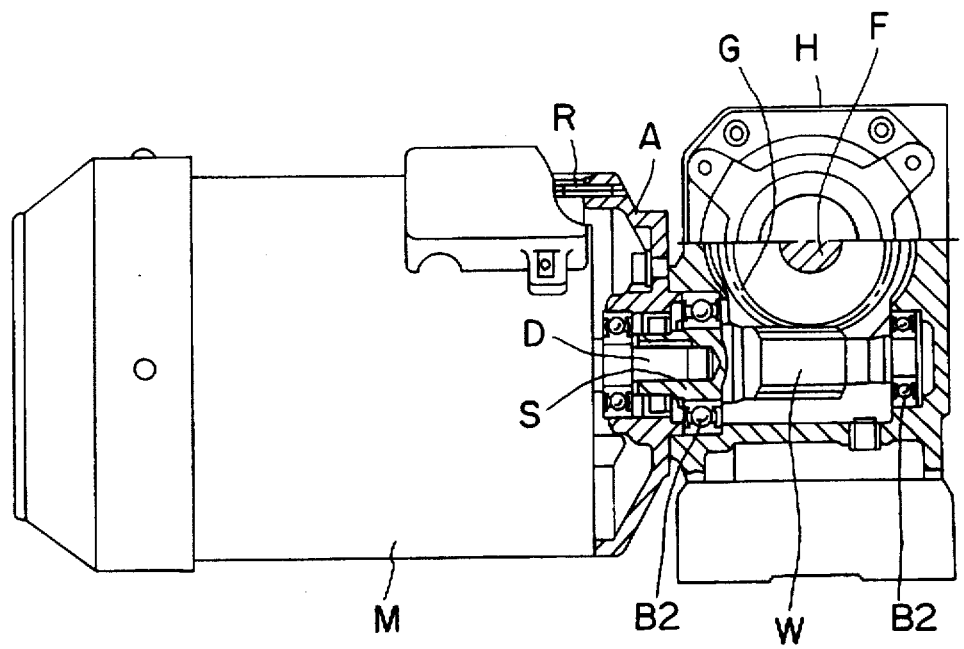
FIG. 3 is a side elevation partially in longitudinal section of a conventional speed reducer of the prior art.
Figure 4:
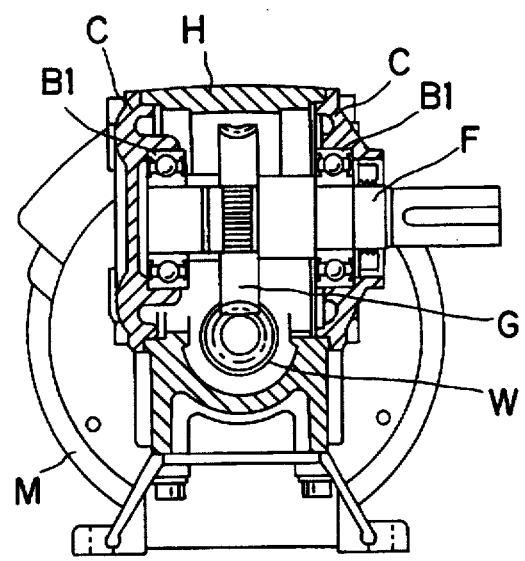
FIG. 4 is an end elevation partially in transverse section of the prior art speed reducer shown in FIG. 3.

As shown in FIGS. 1 and 2, a motor case 1 containing a motor is coupled to a speed reducer case 2 enclosing a worm speed reducer. The end of the speed reducer case 2 coupled to the motor case 1 has an open face defined within a rim 3 which confronts the outwardly-directed surface of a flange plate 9 surrounding the motor spindle 7. The spindle 7 has a projected free end extending longitudinally beyond the flange plate 9. The opposite end of the case 2 has an end wall 13 beyond the free end of the spindle 7 and side walls 14A and 14B extending between the rim 3 and the end wall 13. As shown in FIG. 2, bearing embedding holes or annular openings 5A,5B are bored through the walls 14A and 14B, respectively, in which anti-friction bearings 4A,4B are pressed. The outer race rings of the bearings fit into the openings 5A and 5B, and the inner race rings provide journals for both ends of a worm gear output shaft 4 supporting the worm gear G. The output shaft 4 mounts the worm gear G between the journals provided by the inner race rings of the bearings 4A and 4B. To position the bearings on the shaft 4, the shaft has shoulders 15A and 15B engaging the inner race rings of the bearings 4A and 4B, respectively.

A case leg 6 is formed on the bottom of the speed reducer case 2 to support the case 2 in alignment with the end of the motor case 1. The flange 9 is positioned on the end of the motor case 1 which is coupled to the speed reducer case 2. Bearings 8 for the motor spindle 7 are mounted in the flange 9 to support the end of the spindle 7 which projects outwardly of the flange into the reducer case 2. A worm W is formed on the circumference of the projected free end of the motor spindle 7 to mesh with the worm gear G of the speed reducer.

Assembling the motor case flange 9 onto the rim 3 of the speed reducer case 2 causes the flange to cover the open face and the projected free end of the motor spindle 7 is inserted through the open face into the speed reducer case where the worm W on the projected free end meshes with the worm gear G installed inside the speed reducer case 2. Thus, releasably clamping of the motor case flange 9 to the rim 3 of the speed reducer case by bolts or the like will cover the open face with the motor case flange 9 and at the same time will engage the worm W with the worm gear G, and couple the motor case to the speed reducer case. Releasing the bolts permits separation of the cases for replacement and/or repair.

According to the present invention, since the end of the speed reducer case is made open and the worm gear can be installed inside the speed reducer case through the open face, special openings and covers for installing the worm gear and closing the opening after installation of the worm gear are not needed, and the labor for these operations is not needed. Since the worm W is formed on the circumference of the projected free end of the motor spindle 7, a separate worm and a worm shaft are unnecessary inside the speed reducer case and the bearings for the worm shaft are not needed in the speed reducer case and, therefore, the drilling operation and the labor for assembling the worm shaft in the speed reducer case is not needed.

Furthermore, since the open face of the speed reducer case is closed by the flange attached to the motor case, only the worm gear is needed to be installed inside the speed reducer case and, therefore, the number of assembly parts for the speed reducer case is reduced so that the assembly work of the speed reducer case can be done in a very short time, leading to an effect that the coupling of the speed reducer to the motor can be made compact and smaller and lighter.

The present invention provides a simple and effective method for coupling a speed reducer to a motor spindle which has a worm at its free end. The speed reducer case has an open face which enables the worm gear to be inserted into the case through the open face and the output shaft which mounts the worm gear may be journaled in the speed reducer case so as to position the worm gear for meshing with the worm of the motor spindle. The speed reducer case has openings in the side walls into which the ends of the output shaft project and the output shaft is journaled in the openings by bearings which may be inserted from the outside of the speed reducer case into the openings so that the inner race rings of the anti-friction bearings support the output shaft for rotation. The outer race rings of the anti-friction bearings may be fitted into the openings in the side walls of the casing, and the inner race rings may be slidable on the ends of the shaft. The shaft has shoulders to limit the relative axial displacement of the inner race rings on the shaft. The speed reducer casing with the worm wheel in place may then be releasably clamped to the motor casing by suitable bolts which engage the rim of the open face of the speed reducer casing with the outwardly-directed surface of a flange plate surrounding the spindle of the motor.

While a particular embodiment of the present invention has been herein illustrated and described, it is not intended to limit the invention to such disclosure, but changes and modifications may be made therein and thereto within the scope of the following claims.

We claim:

1. Apparatus for coupling a worm speed reducer to a motor, said motor having a motor case with a flange and a motor spindle supported by spindle bearings embedded on said flange and having a projected free end with a worm thereon, said speed reducer having a case with journals in opposite sides of said case, and an open end face dimensioned to be coupled to the motor case and having a peripheral rim, a worm gear inside the speed reducer case adapted to be engaged with the worm having a shaft supported by said journals, the projected free end of the motor spindle extending through the open face so as to engage the worm with the worm gear, the open face of the speed reducer case being larger than said worm gear and closed by the flange of the motor case, and means detachably clamping said flange to the rim of the open face of the speed reducer case.

2. A speed reducer having an output shaft adapted to be coupled to a motor having a motor case with a motor spindle projecting from one end of the case, an end flange having an outwardly-directed surface surrounding said spindle, and a bearing for said spindle in said end flange to rotatably support said spindle with a free end external to said flange, said free end comprising a worm for driving the speed reducer, said reducer comprising:

a speed reducer case having a rim defining an open face at one and of the speed reducer case adapted to be seated on said outwardly-directed surface and an opposite end wall closing said speed reducer case beyond the free end of said spindle, and side walls surrounding said spindle between said rim and said opposite end wall, said side walls providing spaced-apart aligned journals for rotatably supporting the output shaft;

said output shaft being rotatably mounted in said journals with one end extending through one of said side walls;

a worm gear having a selected outside diameter, said gear being mounted on said output shaft between said journals and adapted to mesh with the worm when said rim is seated on the outwardly-directed surface of the flange;

said rim being dimensioned larger than said selected diameter to afford insertion of said worm gear into said speed reducer case through said open face; and detachable fasteners clamping the speed reducer case to said motor case.

3. A speed reducer according to claim 2 wherein each of said journals comprises an annular opening in the side wall associated with said journal, and an anti-friction bearing mounted in said opening and supporting said output shaft for rotation, each of said anti-friction bearings having an inner race ring axially slidable on said output shaft, and an outer race ring engaging said opening.

4. A speed reducer according to claim 3 wherein said output shaft has shoulders directed outwardly from said worm gear on opposite ends of the shaft, said shoulders abutting the inner race rings of said anti-friction bearings to positively position said worm gear between said the openings of said side walls.

5. A speed reducer according to claim 4 wherein each of said openings passes through the side wall, said anti-friction bearing being engaged in said opening from the outside of said speed reducer case.

6. A method of coupling a speed reducer having an output shaft to a motor having a motor case with a motor spindle projecting from one end of the motor case, an end flange having an outwardly-directed surface surrounding said spindle, and a bearing for said spindle in said end flange to rotatably support said spindle with a free end external to said flange, said free end comprising a worm for driving the speed reducer, said method comprising the steps of:

provided a speed reducer case having a rim defining an open face at one end of the speed reducer case adapted to be seated on said outwardly-directed surface and an opposite end wall closing said speed reducer case beyond the free end of said spindle, and side walls surrounding said spindle between said rim and said opposite end wall, said side walls providing spaced-apart aligned journals for rotatably supporting the output shaft;

rotatably mounting the output shaft in said journals with one end extending through one of said side walls;

providing a worm gear having a selected outside diameter and inserting said gear into said case through said open face, and mounting said gear on said output shaft between said journals and thereafter meshing it with the worm when said rim is seated on the outwardly-directed surface of the flange; and seating said rim on the outwardly-directed surface of the end flange, and detachably clamping the speed reducer case to said motor case.

7. A method of coupling a speed reducer according to claim 6 including the step of providing an anti-friction bearing having inner and outer race rings for each journal, each journal comprising an opening passing through the side wall, mounting the outer race ring in the journal opening from the exterior of the case, and slidably mounting the inner race ring on one end of the output shaft, and positively positioning said worm gear on said shaft between the inner race rings.

* * * * *

UNITED STATES PATENT AND TRADEMARK OFFICE
CERTIFICATE OF CORRECTION

PATENT NO. : 5,758,542
DATED : June 2, 1998
INVENTOR(S) : Yojitsu Kim et al.

It is certified that error appears in the above-identified patent and that said Letters Patent is hereby corrected as shown below:

On the title page item, "[22] insert the following heading:

--[30] Foreign Application Priority Data
   Oct. 17, 1995 [JP].......268475/1995--

Signed and Sealed this

Tenth Day of November 1998

Attest:

BRUCE LEHMAN

*Attesting Officer*          *Commissioner of Patents and Trademarks*